United States Patent
Wang et al.

(10) Patent No.: US 9,660,992 B1
(45) Date of Patent: May 23, 2017

(54) USER-ID INFORMATION PROPAGATION AMONG APPLIANCES

(75) Inventors: Song Wang, Palo Alto, CA (US); Michael Jacobsen, Mountain View, CA (US); Martin Walter, Mountain View, CA (US); Suiqiang Deng, Fremont, CA (US); Zhipu Jin, Milpitas, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 13/531,325

(22) Filed: Jun. 22, 2012

Related U.S. Application Data

(63) Continuation-in-part of application No. 13/113,939, filed on May 23, 2011.

(51) Int. Cl.
H04L 29/06 (2006.01)

(52) U.S. Cl.
CPC ............. H04L 63/10 (2013.01); H04L 63/20 (2013.01)

(58) Field of Classification Search
CPC ................................ H04L 63/10; H04L 63/20
USPC .............................................................. 726/1
See application file for complete search history.

(56) References Cited

U.S. PATENT DOCUMENTS

| | | |
|---|---|---|
| 6,088,801 A | 7/2000 | Grecsek |
| 6,751,634 B1 | 6/2004 | Judd |
| 6,941,465 B1 | 9/2005 | Palekar et al. |
| 6,944,668 B1 * | 9/2005 | Broquist et al. ............... 709/229 |
| 7,240,015 B1 * | 7/2007 | Karmouch et al. ............... 705/4 |
| 7,263,353 B2 | 8/2007 | Forsberg et al. |
| 7,269,853 B1 | 9/2007 | Dunn |
| 7,281,137 B1 * | 10/2007 | Vitikainen ..................... 713/189 |
| 7,324,999 B2 | 1/2008 | Judd |
| 7,360,237 B2 | 4/2008 | Engle et al. |
| 7,395,341 B2 | 7/2008 | Nicodemus et al. |
| 7,428,746 B2 | 9/2008 | Engle et al. |
| 7,428,753 B2 | 9/2008 | Engle et al. |
| 7,475,419 B1 | 1/2009 | Basu et al. |
| 7,555,550 B2 * | 6/2009 | Schunemann ................ 709/224 |
| 7,669,226 B2 | 2/2010 | Bhide et al. |
| 7,818,440 B1 | 10/2010 | Givoly |
| 7,856,652 B2 | 12/2010 | Hieda |
| 7,962,513 B1 * | 6/2011 | Boles et al. ................... 707/781 |
| 8,000,299 B2 * | 8/2011 | Lee ............................... 370/331 |
| 8,260,907 B2 * | 9/2012 | O'Sullivan ................... 709/224 |
| 8,296,820 B2 * | 10/2012 | Kao et al. .......................... 726/1 |
| 8,312,507 B2 * | 11/2012 | Chen et al. ....................... 726/1 |
| 8,423,631 B1 * | 4/2013 | Mower et al. ................ 709/223 |
| 8,516,539 B2 | 8/2013 | Kumar et al. |
| 8,677,447 B1 | 3/2014 | Zuk et al. |
| 2001/0019559 A1 | 9/2001 | Handler et al. |
| 2003/0126613 A1 | 7/2003 | McGuire |
| 2003/0177389 A1 * | 9/2003 | Albert et al. ................. 713/201 |
| 2005/0132060 A1 | 6/2005 | Mo et al. |
| 2006/0075092 A1 | 4/2006 | Kidokoro |
| 2006/0095570 A1 * | 5/2006 | O'Sullivan ..................... 709/224 |
| 2006/0212583 A1 | 9/2006 | Beadle et al. |
| 2006/0277185 A1 | 12/2006 | Sato et al. |

(Continued)

*Primary Examiner* — Jason C Chiang

(74) *Attorney, Agent, or Firm* — Van Pelt, Yi & James LLP

(57) ABSTRACT

Enforcing a policy is described. A mapping between an IP address of a device and a user identity is identified at a first appliance, at least in part by correlating event information. The mapping is transmitted to a second appliance. A policy is applied by the second appliance to the device based at least in part on the user identity.

16 Claims, 10 Drawing Sheets

(56) References Cited

U.S. PATENT DOCUMENTS

| | | |
|---|---|---|
| 2006/0288003 A1 | 12/2006 | Desai et al. |
| 2007/0004393 A1 | 1/2007 | Forsberg et al. |
| 2007/0073519 A1 | 3/2007 | Long |
| 2007/0226775 A1 | 9/2007 | Andreasen et al. |
| 2008/0060064 A1* | 3/2008 | Wynn et al. ............... 726/5 |
| 2008/0109870 A1* | 5/2008 | Sherlock et al. ........... 726/1 |
| 2009/0012760 A1 | 1/2009 | Schunemann |
| 2009/0037998 A1* | 2/2009 | Adhya ............ G06Q 20/027 726/11 |
| 2009/0192970 A1 | 7/2009 | O'Sullivan et al. |
| 2009/0193498 A1 | 7/2009 | Agarwal et al. |
| 2009/0249440 A1 | 10/2009 | Platt et al. |
| 2009/0327503 A1 | 12/2009 | Hochmuth et al. |
| 2010/0071042 A1 | 3/2010 | Hochmuth et al. |
| 2010/0235880 A1* | 9/2010 | Chen et al. .................. 726/1 |
| 2010/0287599 A1 | 11/2010 | He et al. |
| 2010/0325717 A1 | 12/2010 | Goel et al. |
| 2011/0264531 A1 | 10/2011 | Bhatia et al. |
| 2012/0017085 A1* | 1/2012 | Carter et al. ............. 713/168 |
| 2012/0078903 A1* | 3/2012 | Bergstein et al. ........ 707/737 |
| 2012/0271953 A1 | 10/2012 | Gulley et al. |
| 2013/0124563 A1 | 5/2013 | Cavelie et al. |

\* cited by examiner

US 9,660,992 B1

USER-ID INFORMATION PROPAGATION AMONG APPLIANCES

CROSS REFERENCE TO OTHER APPLICATIONS

This application is a continuation in part of co-pending U.S. patent application Ser. No. 13/113,939 entitled USING EVENTS TO IDENTIFY A USER AND ENFORCE POLICIES filed May 23, 2011, which is incorporated herein by reference for all purposes.

BACKGROUND OF THE INVENTION

Devices such as firewalls are sometimes used to prevent users, such as employees of a company, from accessing resources to which they are not authorized. As an example, access to a specific website or to a class of websites may be prohibited for all users. Access can also be granted in a more granular level, such as by permitting some users or groups of users to access a resource, while prohibiting access for other users/groups. Unfortunately, enforcing granular polices can be difficult, particularly as the number and variety of types of devices present in an enterprise network continue to increase.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
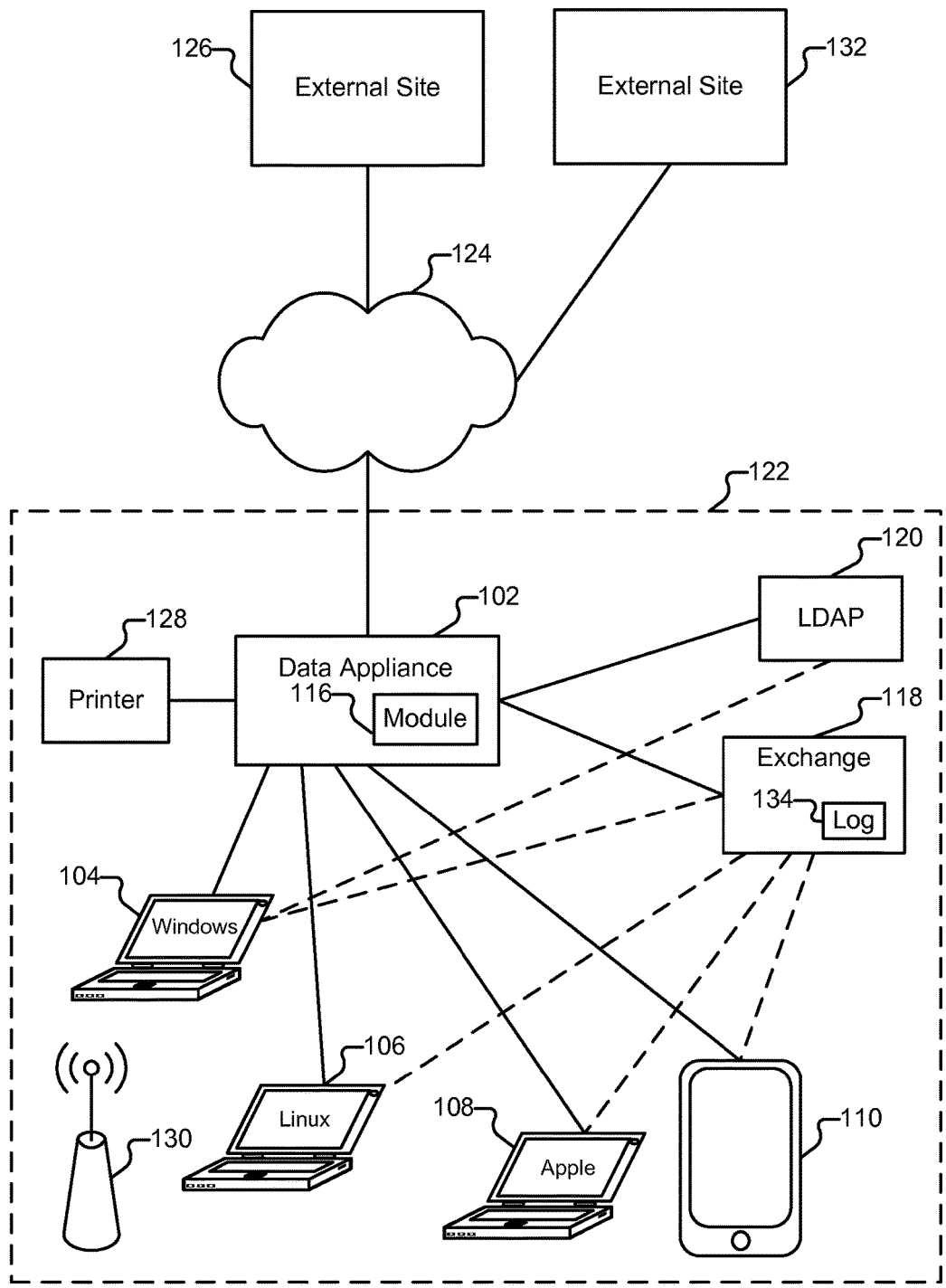
FIG. 1 illustrates an embodiment of an environment in which user identities are determined based on events and in which policies that incorporate the identities can be enforced.

FIG. 1 illustrates an embodiment of an environment in which user identities are determined based on events (such as Microsoft Exchange events) and in which policies that incorporate the identities are enforced. As illustrated in FIG. 1, a variety of client devices 104-110 are present in an enterprise network 122 which belongs to the ACME Corporation. Device 104 is a computer running a Windows-based operating system and is assigned to Alice. Device 106 is a computer running an Ubuntu Linux operating system and is assigned to Bob. Device 108 is a computer running the Mac OS X operating system and is also assigned to Bob. Device 110 is a tablet computer running an Android-based operating system and is personally owned by Alice, who sometimes brings the device into work with her. Device 110 is not provided to Alice by ACME Corporation. Other types of devices may also be used in conjunction with the techniques described herein, such as cellular phones/personal digital assistants, tablet computers, game consoles, and set-top boxes.

Communications between client devices 104-110 and resources outside of network 122 (e.g., external site 126 reachable via external network 124) pass through data appliance 102. Such communications may take place using any appropriate communication protocol, such as Hypertext Transfer Protocol (HTTP), Secure Sockets Layer (SSL), and File Transfer Protocol (FTP). In the example shown in FIG. 1, data appliance 102 is a firewall and is configured to enforce policies (also referred to herein as "rules") with respect to the communications it receives. Other types of devices can also be configured to provide the functionality described herein as being performed by data appliance 102. For example, a router, gateway, intrusion detection system, intrusion prevention system, or other appropriate device can be configured to perform either or both of the user identity detection functionality and policy enforcement functionality. In some embodiments, data appliance 102 is also configured to enforce policies with respect to traffic that stays within enterprise network 122. As will be described in more detail below, in some embodiments, enterprise network 122 includes multiple data appliances; traffic may flow through or otherwise be managed by one or multiple data appliances in such embodiments.

Also included in network 122 is a directory service provider 120 (also referred to as a domain controller), which makes use of the Lightweight Directory Access Protocol (LDAP) or other appropriate protocols. Directory service provider 120 is configured to manage user identity and credential information. Examples of directory service providers include Microsoft Active Directory and Novell eDirectory. Other types of systems can also be used instead of directory service provider 120, such as a Kerberos-based system, and the techniques described herein adapted accordingly. In various embodiments, network 122 includes multiple directory service providers. In various embodiments, data appliance 102 is configured to periodically pull information from directory service provider 120.

Appliance 102 uses information stored by directory service provider 120 to enforce various policies. Such policies may apply to particular devices (e.g., device 104), particular users (e.g., "Alice Jones," denoted in directory service provider 120 as the object Alice.Jones), and/or groups (e.g., "laptop devices," "employees in the Marketing Department," and "director-level employees," each of which can also be represented in directory service provider 120 as an applicable object or set of objects). As one example, a policy may specify that device 104 is permitted to send print jobs to printer 128 while device 106 may not. As another example, a policy may specify that employees in the engineering department are permitted to access external site 126, while other employees are not. Policies can also be used for other purposes, such as performing quality of service control, decryption control, etc.

Each morning when Alice arrives at ACME Corporation and logs into her computer 104, credential information is exchanged between client device 104 and directory service provider 120. Data appliance 102 is made aware of the fact that Alice has successfully logged into device 104 and is able to apply appropriate policies to Alice's communications, whether they are rules pertaining specifically to device 104, to Alice (e.g., the Alice.Jones object stored by directory service provider 120), or to a group of which Alice's object is a member (e.g., the Marketing Department). Throughout the day, Alice's computer communicates with mail server 118—a Microsoft Exchange server in the example shown in FIG. 1—to send and retrieve email messages, calendar information, and other information, as applicable.

Bob also has identity/credential information maintained by directory service provider 120. For example, included in directory service provider 120 is an object for Bob.Smith. However, as neither of Bob's computers 106 and 108 runs a Microsoft-based operating system, they do not exchange credential information with directory service provider 120 when Bob logs into them. As with Alice's computer 104 however, computer 106 periodically communicates with mail server 118 to retrieve email for Bob and to send any mail authored by Bob. Bob does not use computer 108 to access Microsoft Exchange server 118.

Included in network 122 is an 802.11 wireless access point (130). Alice has configured her personal tablet 110 to make use of the access point to communicate with external sites 126 and 132. Alice has also configured her personal tablet 110 to fetch email from Microsoft Exchange server 118. As with Bob's computers 106 and 108, Alice's tablet 110 does not communicate with directory service provider 120.

Microsoft Exchange server 118 is configured to keep, in log 134, event information such as the IP address, email address, and/or other credential information of ACME employees that access the Microsoft Exchange server to retrieve and send email. As will be described in more detail below, applicable portions of the contents of log 134 can be correlated with the contents of directory service provider 120. The results of the correlation are provided to data appliance 102 and allow data appliance 102 to enforce user policies against devices, such as devices 106-110, irrespective of whether those devices directly communicate with directory service provider 120.

In some embodiments, log data 134 and data from directory service provider 120 are collected and correlated by a module 116. The module can be implemented in a variety of ways, such as in a device that is separate from appliance 102 or as a module collocated on appliance 102 (as shown in FIG. 1), as applicable.

Figures 2A, 2B, 2C, 2D:
FIG. 2A illustrates a representation of log data obtained from a mail server.
FIG. 2B illustrates an example of a set of policies.
FIG. 2C illustrates an example of a policy.
FIG. 2D illustrates an example of a set of policies.

FIG. 2A illustrates a representation of log data obtained from a mail server. The information shown is an abstraction of some of the types of information that can be extracted from log 134 of Microsoft Exchange server 118, in some embodiments. Other types of information may also be extracted from a log and correlated with the contents of directory service provider 120, as applicable. In the example shown in FIG. 2A, Alice's tablet computer 110, which has an IP address of 10.0.0.5, attempts to connect to server 118, provides Alice's corporate email address (AliceJ@ACME.COM), and provides Alice's correct password. A session is then successfully established between tablet 110 and server 118, allowing the tablet access to Alice's email and allowing tablet 110 the ability to send email on behalf of Alice.

The log data shown in FIG. 2A is retrieved by module 116, which extracts pertinent information such as the date-time information, the IP address (10.0.0.5), and the email address (AliceJ@ACME.COM). Module 116 correlates the extracted email address with information stored in directory service provider 120 to determine that the owner of the email address (AliceJ@ACME.COM) is the same individual as is represented in directory service provider 120, as object Alice.Jones. Module 116 is thus able to determine that the user of tablet 110 (as of time 202) is Alice Jones. Appliance 102 can then enforce any applicable rules against tablet 110, and in particular, can now enforce any applicable user, group, or other appropriate rules, instead of merely enforcing device rules. In various embodiments, timeout information is also determined by module 116. As one example, when an indicator 210 is received that the session between tablet 110 and Microsoft Exchange server 118 has ended, module 116 can determine that the mapping is no longer valid (or will cease being valid within some period of time). As another example, the mapping information determined by module 116 is periodically automatically purged and/or refreshed, instead of or in addition to module 116 awaiting indicators, such as indicator 210, to know that a session has ended and the mapping may no longer be valid.

FIG. 2B illustrates an example of a set of policies. Suppose ACME Corporation has a policy generally allowing its employees to access social networking sites from company computers, so long as the employees do not spend an excessive amount of time on such sites or post inappropriate things to such sites. Alice was recently determined to have violated the policy (e.g., by allowing her productivity to slip). To help Alice focus on her job, without penalizing other employees such as Bob, a rule was included in data appliance 102 that prohibits Alice from accessing site 132, entirely. When Alice uses computer 104, data appliance 102 is able to determine that it is Alice using her computer (instead of another user) because Alice logs into computer 104 with the assistance of directory service provider 120. Accordingly, if Alice attempts to access site 132 using computer 104, that access would be blocked by appliance 102. If Alice were to attempt to access site 132 with her tablet 110 while at work, without the techniques described herein being deployed, it is possible that she would succeed in reaching site 132 because appliance 102 would be unaware that the tablet is being used by Alice instead of by another ACME employee (or a visitor). However, because data appliance 102 is able to determine a mapping between tablet 110's IP address and Alice's object within directory service provider 120, Alice's attempted access of site 132 by tablet 110 can also be prevented by appliance 102.

Figure 3:
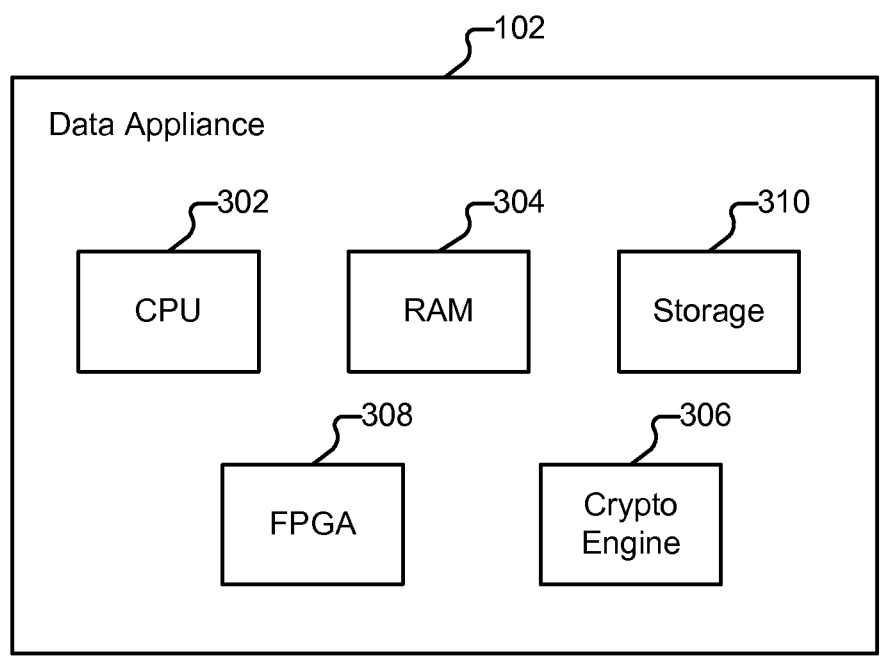
FIG. 3 illustrates an embodiment of a data appliance.

FIG. 3 illustrates an embodiment of a data appliance. The example shown is a representation of physical components that can be included in data appliance 102. Specifically, data appliance 102 includes a high performance multi-core CPU 302 and RAM 304. Data appliance 102 also includes a storage 310 (such as one or more hard disks), which is used to store policy and other configuration information, as well as user/group information received from sources such as directory service provider 120 and/or other data appliances (described in more detail below). Data appliance 102 can also include one or more optional hardware accelerators. For example, data appliance 102 can include a cryptographic engine 306, configured to perform encryption and decryption operations, and one or more FPGAs 308, configured to perform signature matching, act as network processors, and/or perform other tasks.

Figure 4:
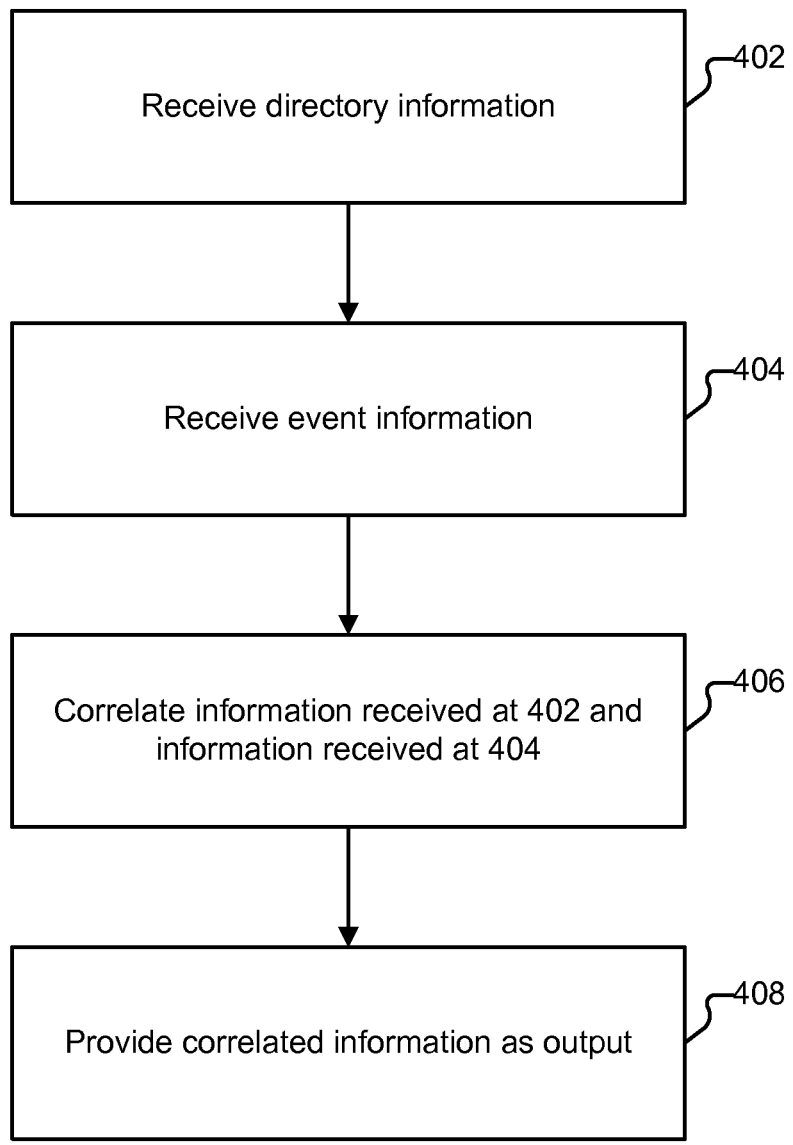
FIG. 4 illustrates an example of a process for identifying a user from an event.

FIG. 4 illustrates an example of a process for identifying a user from an event. In some embodiments, the process shown in FIG. 4 is performed by appliance 102. The process begins at 402 when information is received from directory service provider 120. As one example, at 402, appliance 102 receives from directory service provider 120 the hierarchy of objects it stores (including the Alice.Jones object). In some embodiments the information is periodically refreshed as applicable, such as once per hour or once per day. At 404, event information is received, such as when Microsoft Exchange log 134 or portions thereof are received from Microsoft Exchange server 118. At 406, the received information is correlated. As one example, at 406, a determination is made that tablet 110 is being operated by Alice, based on the successful connection made by tablet 110 (having an IP address of 10.0.0.5) to Microsoft Exchange server 118, using Alice's credentials (AliceJ@ACME.COM and corresponding password). Finally, at 408, the correlated information (e.g., that 10.0.0.5 maps to Alice.Jones) is provided as output, so that it can enforce any applicable policies based on the correlated information and policies stored in storage 310 and/or loaded into RAM 304. As will be described in more detail below, in some embodiments, output is provided to other data appliances at 408.

Additional elements can be included in the process shown in FIG. 4. One example is an initialization element (establishing an initial connection between module 116 and each of directory service provider 120 and server 118) made prior to portion 402 of the process shown in FIG. 4.

Figure 5:
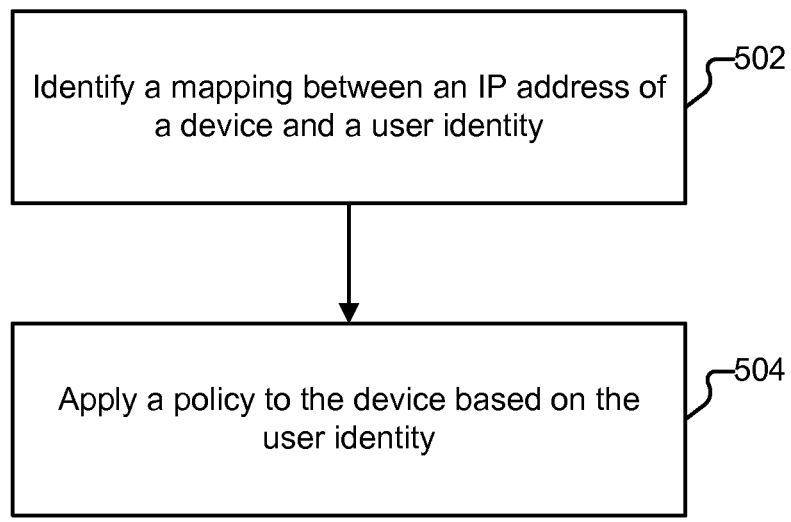
FIG. 5 illustrates an example of a process for enforcing a policy.

FIG. 5 illustrates an example of a process for enforcing a policy. In some embodiments, the process shown in FIG. 5 is performed by data appliance 102. The process begins at 502 when a mapping between an IP address of a device and a user is determined. As one example, a mapping is determined when module 116 determines that Alice is using tablet 110—in particular, by determining a mapping between the applicable IP address (tablet 110's IP address, 10.0.0.5) and directory service provider 120 user object (Alice.Jones). At 504, a policy is applied to the device based on the identified user identity. As one example, at 504, rule 204 would be applied to block an attempt by Alice (using either tablet 110 or computer 104) to access site 132. As another example, at 504, rule 206 would be applied to allow Alice to print to printer 128 from either computer 104 or tablet 110, because Alice is a member of the Marketing Department.

Figure 6:
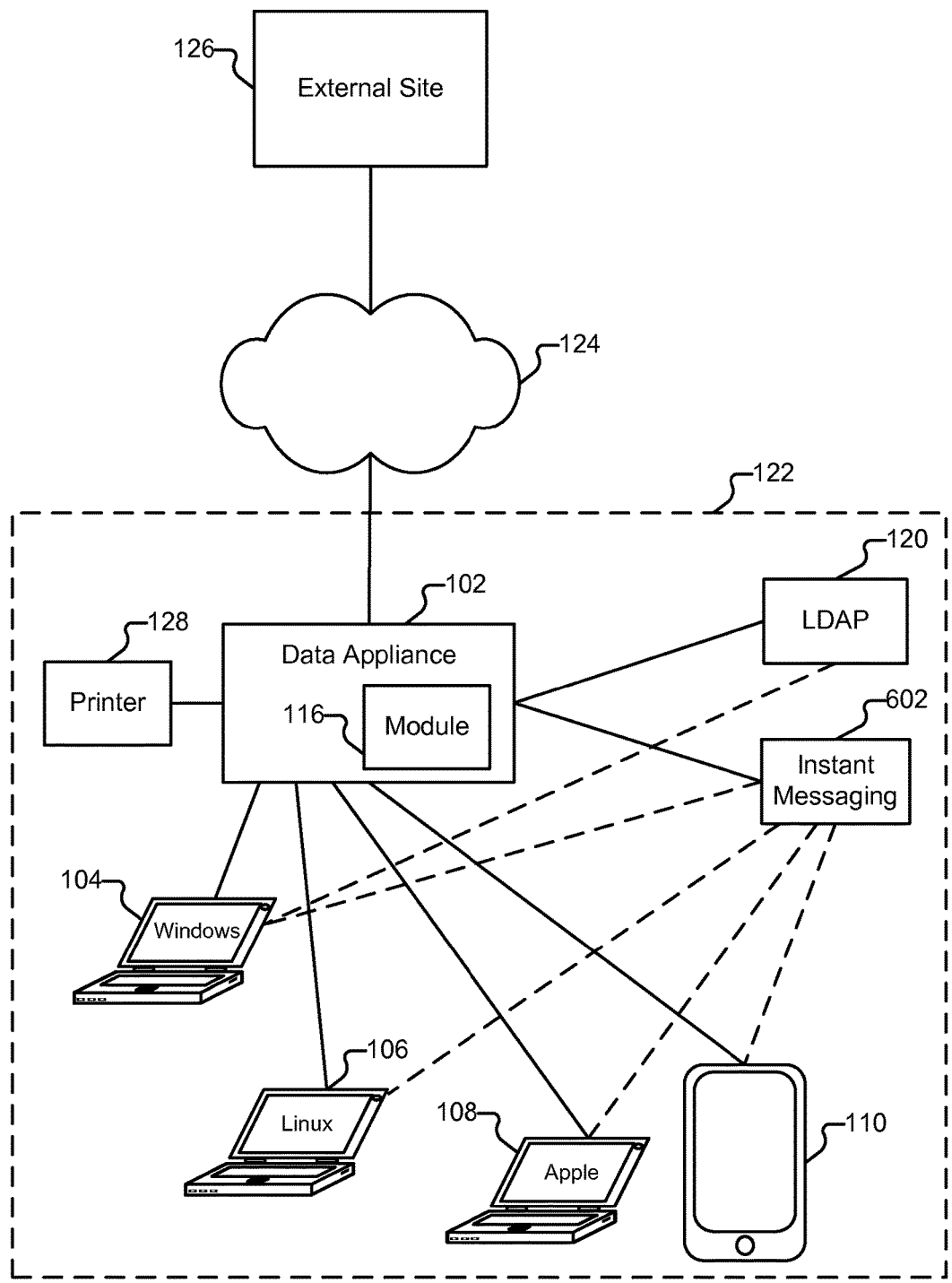
FIG. 6 illustrates an embodiment of an environment in which user identities are determined based on events (such as instant messaging events) and in which policies that incorporate the determined identities can be enforced.

FIG. 6 illustrates an embodiment of an environment in which user identities are determined based on events (such as instant messaging events) and in which policies that incorporate the determined identities can be enforced. As illustrated in the example shown in FIG. 6, user identity information can be obtained from sources other than mail servers and the techniques described herein adapted accordingly.

As one example, suppose device 108 is not used by Bob to check his corporate email (e.g., because he uses device 106 for that purpose). Bob does use computer 108 to access an enterprise instant messaging service (provided by instant messaging server 602) to communicate with other employees. Instant messaging server 602 requires its users to log in using credential information, such as a first and last name, or a corporate email address. Instant messaging server 602 also keeps event logs that include information, such as the date and time users access the instant messaging server, the credential information they supply, and whether or not access attempts are successful. In various embodiments, module 116 is configured to retrieve the log information that is stored by instant messaging server 602 and correlate it with information stored by directory service provider 120.

The correlated information can be used by appliance 102 to enforce policies, such as policy 208, shown in FIG. 2C. Specifically, policy 208 allows any ACME employee who is also a member of the Engineering Department to access any destination, so long as the access occurs using the ssh protocol. When Bob uses computer 106, his identity would be usable by data appliance 102 to enforce policy 208, due to the processes shown in FIGS. 4 and 5 being applied with respect to computer 106. When Bob uses computer 108 to communicate with instant messaging server 602, Bob's computer will also be recognized as being operated by a member of the Engineering Department (e.g., through the processes shown in FIGS. 4 and 5), and rule 208 can be applied to computer 108 to permit Bob to access site 126 using ssh (whereas, without the processing being performed, Bob might otherwise be required to use computer 106 for the same purpose).

Another set of policies that can be enforced is shown in FIG. 2D. Specifically, the rules permit members of the Engineering Department to access a bug tracking system (212), while denying access to the bug tracking system to everyone else (214). When Bob uses computer 106 to access his email (or uses computer 108 for instant messaging purposes), his identity would be usable by data appliance 102 to enforce policy 212 due to the processes shown in FIGS. 4 and 5 being applied with respect to computers 106 and/or 108, and without either of those computers needing to directly communicate with directory service provider 120.

Figure 7:
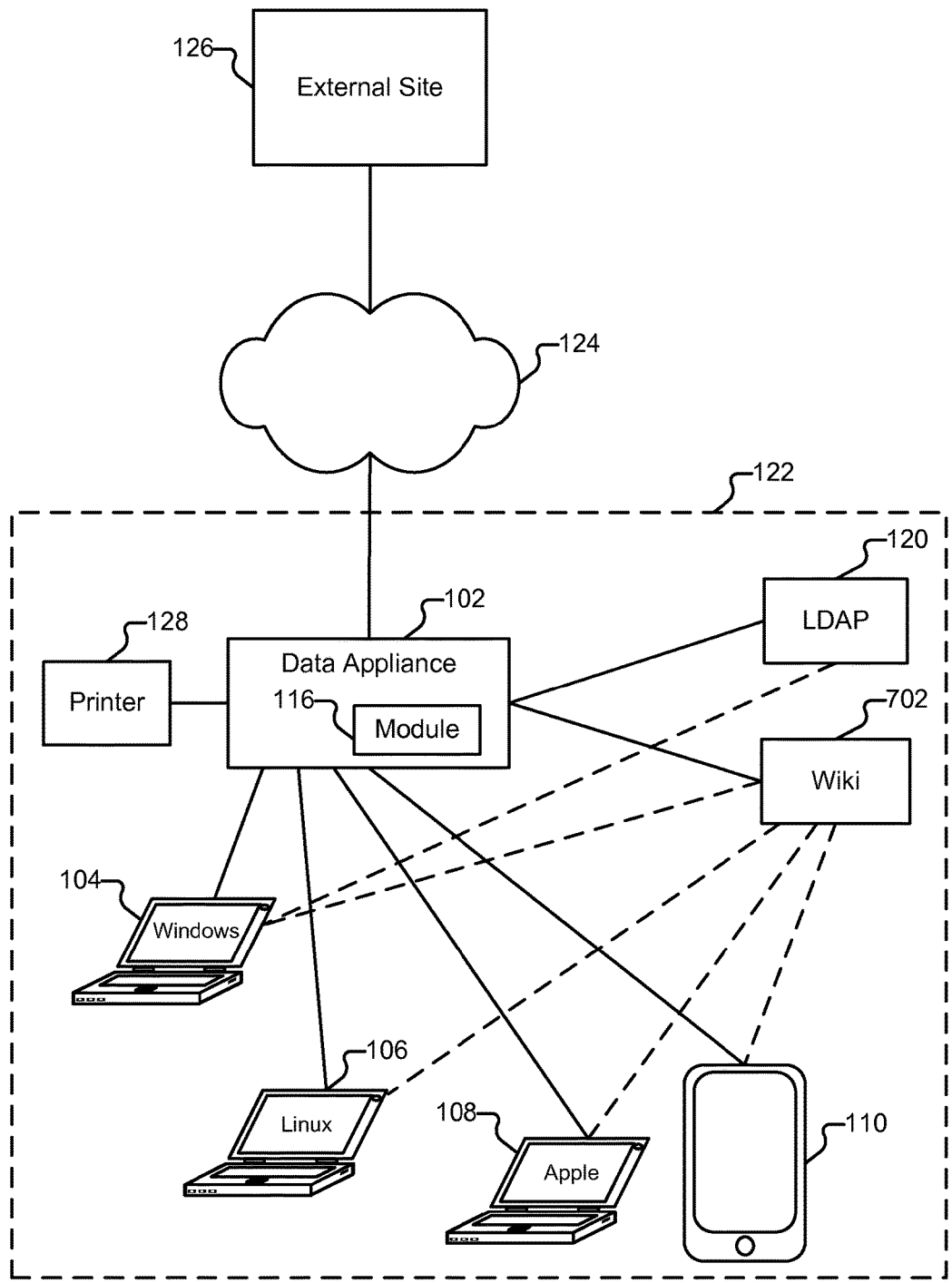
FIG. 7 illustrates an embodiment of an environment in which user identities are determined based on events and in which policies that incorporate the determined identities can be enforced.

FIG. 7 illustrates an embodiment of an environment in which user identities are determined based on events (such as collaborative editing events) and in which policies that incorporate the determined identities can be enforced. Suppose device 108 is not used by Bob to check his corporate email (e.g., because he uses device 106 for that purpose).

Bob does use computer 108 to access a collaborative website (an enterprise Wiki 702) to collaborate with other employees on documentation. Wiki 702 requires its users to log in using credential information, such as a first and last name, or a corporate email address. Wiki 702 also keeps event logs that include information, such as the date and time users access the Wiki, the credential information they supply, and whether or not access attempts are successful. In various embodiments, module 116 is configured to retrieve the log information that is stored by Wiki 702 and correlate it with information stored by directory service provider 120. The correlated information can be used to enforce policies, such as policy 208, shown in FIG. 2C. When Bob uses computer 108 to communicate with Wiki 702, Bob's computer will be recognized as being operated by a member of the Engineering Department (e.g., through the processes shown in FIGS. 4 and 5), and rule 208 can be applied to computer 108 to permit Bob to access site 126 using ssh (whereas, without the processing being performed, Bob might otherwise be required to use computer 106 for the same purpose).

Propagating Information Among Appliances

As mentioned above, network 122 can include multiple data appliances and can also include multiple directory service providers and/or other sources of user and/or group information. As will be described in more detail below, in various embodiments, data appliances store mapping information in a table (or other appropriate data structure) and propagate user/group information to one another. In some embodiments, mapping information is propagated between data appliances using SSL connections. An embodiment of network 122 that includes multiple appliances and directory service providers is depicted in FIG. 8.

Figure 8:
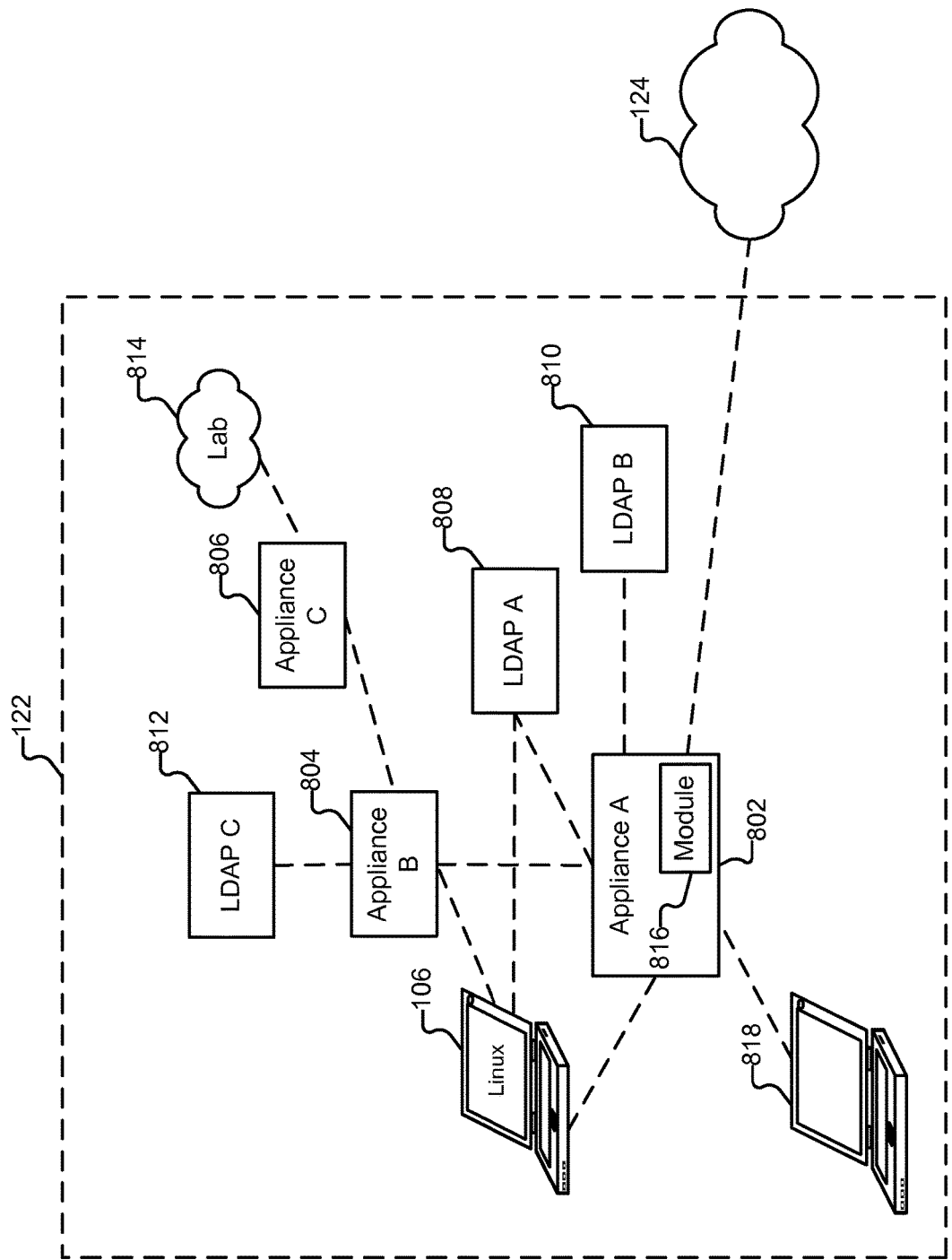
FIG. 8 illustrates an embodiment of a network that includes multiple appliances and directory service providers.

As shown in FIG. 8, data appliances 802-806 are embodiments of data appliance 102. Data appliance 802 is configured to communicate with directory service providers 808 and 810 (which are embodiments of directory service provider 120). Data appliance 804 is configured to communicate with directory service provider 812 (also an embodiment of directory service provider 120). Data appliances 804 and 806 are not configured to communicate with directory service providers 808 or 810, and data appliances 802 and 806 are not configured to communicate with directory service provider 812. In each case where a data appliance is configured to communicate with a directory service provider, the data appliance is configured to obtain user/group identity information from that data appliance (e.g., by module 816).

Module 816 is an embodiment of module 116. In some embodiments, module 816 is configured to collect user/group identity information from a variety of sources, in addition to directory service providers 808 and 810. One example is a direct report from a host to data appliance 802 (e.g., imitated as part of a login script). Additional examples of such additional sources include:

Direct Event Log Monitoring.

Data appliance 802 can be configured to query directory service providers and other systems (such as Microsoft Exchange server 118 and instant messaging server 602) for user/group information. As one example, data appliance 802 can include a WMI client that performs WMI queries of such systems. In some embodiments, available domain controllers are automatically identified by data appliance 802, such as through DNS. A list of discovered domain controllers is presented to an administrator of data appliance 802 in a configuration screen and the administrator is given the option of monitoring (or not monitoring) one or more of the listed domain controllers. In other embodiments, which domain controllers should be monitored are manually specified as a configuration option to data appliance 802. As needed, the administrator of appliance 802 can specify credentials needed to perform queries or otherwise obtain log information from the domain controller and/or other servers.

Direct Host Probing.

Data appliance 802 can be configured to remotely probe host computers for logged on user information through NetBIOS, Windows Management Instrumentation (WMI), and/or other applicable techniques. In such embodiments, data appliance 802 includes domain credentials for an administrator account or other account with sufficient privileges and periodically probes clients for user information. Any changed information is updated on appliance 802 and entries for unresponsive hosts are removed. In some embodiments, only the information of domain authenticated users is stored by appliance 802—user information pertaining solely to a local user of the host being probed is ignored.

Captive Portal Collected Information.

Data appliance 802 can be configured to send and receive NTLM, Kerberos, or other (e.g., web form-based) challenges and responses to a client device such as client device 818 to obtain credential information. One reason for this is to capture information about users who do not log into the domain through a domain controller (but have associated user/group objects stored there). The obtained credential information can then be used by appliance 802 to query the domain controller for verification.

SSL VPN.

In some embodiments, data appliance 802 provides VPN services. Credentials entered when setting up a VPN tunnel can be used by appliance 802 for other purposes, such as to determine group membership applicable to the client device and to propagate that group/IP address mapping to other data appliances. As shown in FIG. 8, data appliance 802 might provide a VPN tunnel between client device 818 and a resource accessible via network 124. When the tunnel is set up, credential information (e.g., Bob's information) can be collected by appliance 802 and propagated to appliance 804 (and/or appliance 806) as applicable.

Information Collected from Other Data Appliances.

Data appliance 802 can be configured to receive user/group mapping information from other data appliances (e.g. data appliance 804) and similarly configured to propagate mapping information to other data appliances. In some embodiments such mapping information is exchanged between data appliances using an XML API. Data appliance 802 can also serve as a proxy for LDAP and/or other queries on behalf of other data appliances, rather than, or in addition to providing the other data appliances with mapping information. When a data appliance (e.g., data appliance 802) is configured to collect mapping information itself and also receives mapping information from other data appliances, in some embodiments, the received data is aggregated. For example, different directory service providers (e.g., 808 and 810) may maintain different group objects of which Bob.Smith is a member. Bob's group membership can be aggregated by appliance 802. A variety of techniques can be used to resolve conflicts if/when they occur. One approach is for the fresher of any conflicting information to be used. Another approach is to prioritize information collected by the data appliance itself over mapping information it receives from other data appliances. Yet another approach is to prioritize information received from certain sources (e.g., received from a captive portal verification) over other sources (e.g., received from appliance 804).

In various embodiments, only some mappings (or other user/group information) obtained at one data appliance are propagated to other appliances. For example, information collected from direct event log monitoring can be propagated by data appliance 802 to appliances 804 and 806, while information collected via an SSL VPN is not. As another example, group membership information collected by appliance 804 via a direct LDAP query of directory service provider 812 is propagated to appliance 802. To prevent query loops, appliance 802 does not further propagate the group information to appliance 806 as appliance 802 did not obtain the information as a result of a direct query.

Figure 9:
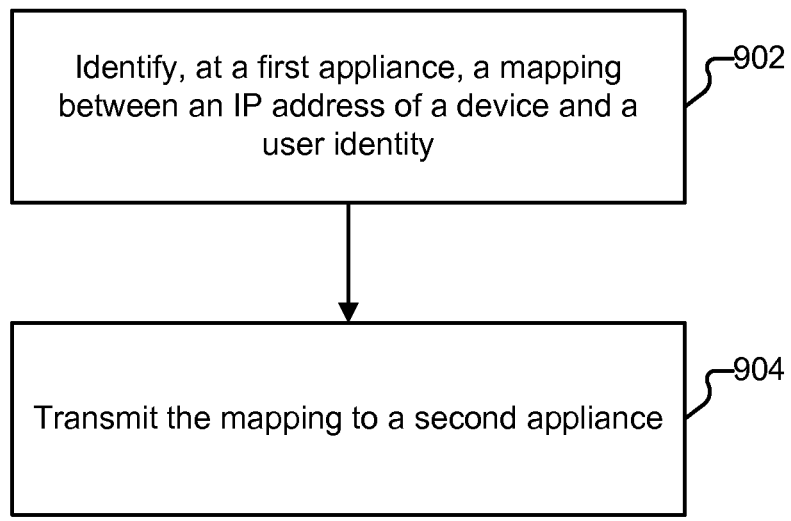
FIG. 9 illustrates an example of a process for propagating user identity information.

FIG. 9 illustrates an example of a process for propagating user identity information. In some embodiments, process 900 is performed by a data appliance such as data appliance 802. The process begins at 902 when a mapping between an IP address of a device and a user is determined. As one example, a mapping is determined when module 816 determines that Bob is using client device 818 (e.g., through use of a captive portal that collects and verifies Bob's domain credentials). At 904, the mapping is transmitted to a second appliance. As one example, a mapping between the IP address of client device 818, Bob's user object (Bob.Smith), and any applicable group information (e.g., that Bob is in the Engineering Department) is transmitted to data appliance 804. The transmission at 904 can be performed as a push operation (e.g., pushing the mapping from data appliance 802 to data appliance 804). The transmission at 904 can also be performed as a pull operation (e.g., pulling the mapping from data appliance 802 by data appliance 804). The transmission of mapping information can be performed periodically (e.g., every 5 minutes) and can also be performed in response to a triggering event. One example of a triggering event is the detection by module 816 of a new mapping (i.e., as a result of Bob recently logging into client device 818).

Figure 10:
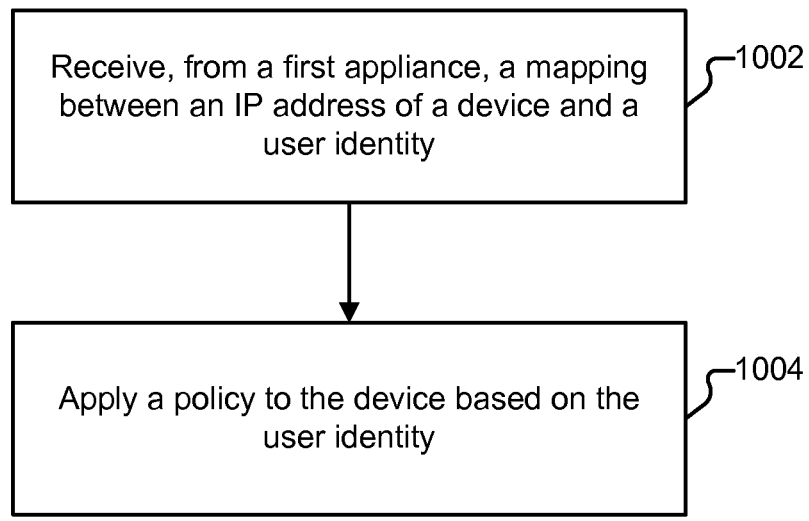
FIG. 10 illustrates an example of a process for enforcing a policy.

FIG. 10 illustrates an example of a process for enforcing a policy. In some embodiments, the process shown in FIG. 10 is performed by appliance 804. The process begins at 1002 when a mapping between an IP address of a device and a user is received. As one example, data appliance 804 regularly receives user identity information from data appliance 802. Such information can be received (1002) based on the elapsing of a set amount of time (e.g. 10 minutes) and can also be received based on the occurrence of a triggering event, such as a change in the information detected by appliance 802 (e.g., a determination that Bob has just logged into client device 818, or a forced refresh initiated by an administrator). At 1004, a policy is applied to the device based on the identified user identity. One example of the processing performed at 1004 is as follows. Suppose only members of the Engineering Department are allowed to access an internal lab network 814. Appliance 806, sitting at the gateway to network 814, is not directly in communication with a directory service provider (that would store a group object pertaining to the Engineering Department). Bob attempts to connect to network 814 using client device 106. His traffic passes through data appliance 804 (which obtains group information from directory service provider 812). Appliance 804 is in communication with appliance 806 and propagates the user identity information it has (e.g., acquired from directory service provider 812) to appliance 806. Appliance 806 can then grant access to network 814 to Bob because it is able to determine that he is a member of the Engineering Group.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive, at a first appliance, log data generated in response to a user-provided device authenticating to an electronic mail server on a first network, wherein the user-provided device is not authenticating to a directory service provider accessible via the first network;
determine a first mapping between an IP address of the user-provided device and an identity of a user based at least in part on correlating at least a portion of the received log data, including a username portion of an email address, and identity information associated with the user and stored in the directory service provider;
receive, at a third appliance, and from the first appliance, the first mapping between the IP address of the device and the user identity, wherein the first appliance is responsible for controlling access to resources on the first network, wherein the third appliance is responsible for controlling access to resources on a third network, and wherein access by the device to a resource on the third network is determined by the third appliance based at least in part on a policy associated with the user identity;
receive, at the third appliance, and from a second appliance, a conflicting second mapping between at least one of the IP address and the user identity, wherein the second appliance is responsible for controlling access to resources on a second network; and
determine, in response to receiving conflicting mappings from the respective first and second appliances, which of the received first and second mappings should be used in determining whether to permit access to the resource on the third network, at least in part by determining a respective priority associated with the first appliance as a source of information and the second appliance as a source of information; and
a memory coupled to the processor and configured to provide the processor with instructions.

2. The system of claim 1 wherein the user identity comprises a user object maintained by the directory service provider.

3. The system of claim 1 wherein the first mapping is determined at least in part by evaluating information obtained from a captive portal challenge.

4. The system of claim 1 wherein the first mapping is determined at least in part by evaluating information obtained from an SSL VPN.

5. The system of claim 1 wherein the first mapping is determined at least in part by evaluating log information obtained by the first appliance from an appliance that is different from the first appliance.

6. The system of claim 1 wherein the user identity includes a group.

7. The system of claim 1 wherein the first appliance is configured to transmit the first mapping to the third appliance using a push operation.

8. The system of claim 1 wherein the second appliance is configured to transmit the second mapping to the third appliance in response to receiving a pull request from the third appliance.

9. A method, comprising:
receiving, at a first appliance, log data generated in response to a user-provided device authenticating to an electronic mail server on a first network, wherein the user-provided device is not authenticating to a directory service provider accessible via the first network;
determining a first mapping between an IP address of the user-provided device and an identity of a user based at least in part on correlating at least a portion of the received log data, including a username portion of an email address, and identity information associated with the user and stored in the directory service provider;
receiving, at a third appliance, and from the first appliance, the first mapping between the IP address of the device and the user identity, wherein the first appliance is responsible for controlling access to resources on the first network, wherein the third appliance is responsible for controlling access to resources on a third network, and wherein access by the device to a resource on the third network is determined by the third appliance based at least in part on a policy associated with the user identity;
receiving, at the third appliance, and from a second appliance, a conflicting second mapping between at least one of the IP address and the user identity, wherein the second appliance is responsible for controlling access to resources on a second network; and
determining, in response to receiving conflicting mappings from the respective first and second appliances, which of the received first and second mappings should be used in determining whether to permit access to the resource on the third network, at least in part by determining a respective priority associated with the first appliance as a source of information and the second appliance as a source of information.

10. The method of claim 9 wherein the user identity comprises a user object maintained by the directory service provider.

11. The method of claim 9 wherein the mapping includes evaluating information obtained from a captive portal challenge.

12. The method of claim 9 wherein the first mapping is determined at least in part by evaluating information obtained from an SSL VPN.

13. The method of claim 9 wherein the first mapping is determined at least in part by evaluating log information obtained by the first appliance from an appliance that is different from the first appliance.

14. The method of claim 9 wherein the user identity includes a group.

15. The method of claim 9 wherein transmitting the first mapping to the third appliance includes using a push operation.

16. The method of claim 9 wherein transmitting the second mapping to the third appliance is performed in response to receiving a pull request from the third appliance.

* * * * *